(12) United States Patent  (10) Patent No.: US 9,386,195 B2
Yamagata et al.  (45) Date of Patent: Jul. 5, 2016

(54) ELECTRONIC APPARATUS HAVING EXTERIOR COVERS

(71) Applicant: CANON KABUSHIKI KAISHA, Tokyo (JP)

(72) Inventors: Kenji Yamagata, Yokohama (JP); Shinnosuke Torii, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/107,414

(22) Filed: Dec. 16, 2013

(65) Prior Publication Data

US 2014/0176791 A1    Jun. 26, 2014

(30) Foreign Application Priority Data

Dec. 21, 2012 (JP) ................................. 2012-279469

(51) Int. Cl.
*H04N 5/225* (2006.01)
(52) U.S. Cl.
CPC .................................. *H04N 5/2252* (2013.01)
(58) Field of Classification Search
None
See application file for complete search history.

(56) References Cited

U.S. PATENT DOCUMENTS

| 5,689,735 A * | 11/1997 | Horning et al. ............... 396/29 |
| 5,729,769 A * | 3/1998 | Rydelek ........................... 396/29 |
| 5,897,225 A * | 4/1999 | Rieger et al. ................... 396/29 |
| 6,574,435 B1 * | 6/2003 | Smith et al. ................... 396/29 |
| 6,715,939 B2 * | 4/2004 | Ford ............................... 396/427 |
| 2010/0124697 A1 * | 5/2010 | Chen ..................... H04M 1/0262 429/97 |

FOREIGN PATENT DOCUMENTS

JP           08-015771 A     1/1996

* cited by examiner

*Primary Examiner* — Albert Cutler
(74) *Attorney, Agent, or Firm* — Rossi, Kimms & McDowell LLP

(57) ABSTRACT

An electronic apparatus capable of reducing assembly man-hours to reduce fabrication costs and capable of improving appearance design thereof. An upper cover of the electronic apparatus has a first abutment portion abutted with a second abutment portion of a right cover. Engagement portions are formed on an inner face of the upper cover, and latch portions are disposed between adjacent ones of the engagement portions and provided to project toward the right cover beyond the first abutment portion. The right cover has engaged portions disposed along the second abutment portion and provided to project toward the upper cover beyond the second abutment portion, and latched portions are disposed between adjacent ones of the engaged portions. The engaged portions of the right cover are engaged with the engagement portions of the upper cover, and the latched portions of the right cover are latched to the latch portions of the upper cover.

5 Claims, 15 Drawing Sheets

ELECTRONIC APPARATUS HAVING EXTERIOR COVERS

BACKGROUND OF THE INVENTION

1. Field of the Invention

The present invention relates to an electronic apparatus having exterior covers, and more particularly, to an exterior cover connecting structure of an image pickup apparatus such as a digital camera or a digital video camera.

2. Description of the Related Art

An electronic apparatus such as an image pickup apparatus has exterior covers. For example, a digital video camera shown in FIGS. 16A and 16B has a main unit 201 that is covered by a front cover unit 202, an upper cover unit 203, a left cover unit 204, and a right cover unit 205.

Figure 16A:
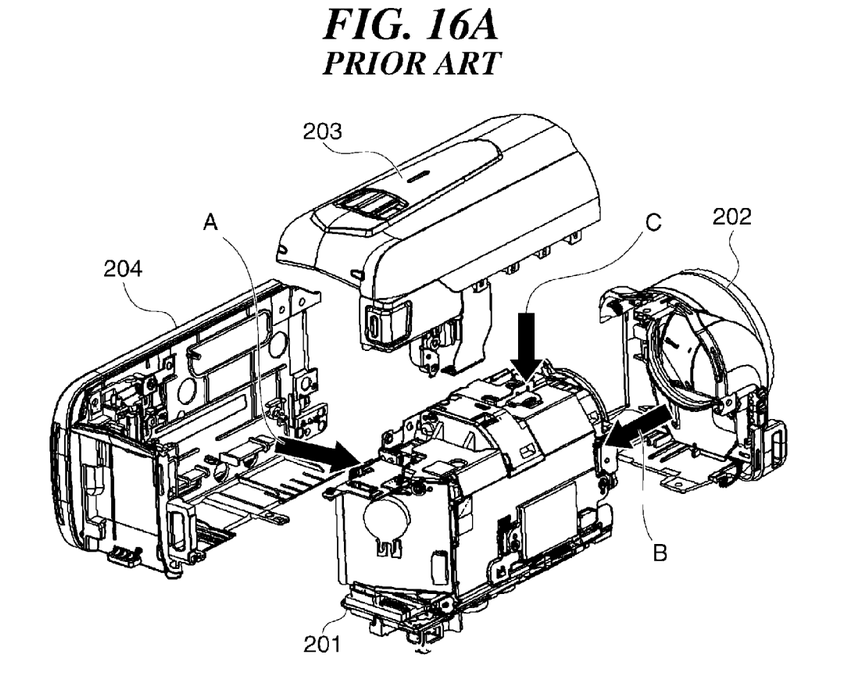
FIGS. 16A and 16B are rear perspective views showing how cover units are assembled together in a conventional electronic apparatus.

To assemble the cover units 202-205 to the main unit 201, the front and left cover units 202, 204 are assembled to the main unit 201 in this order as shown by arrows A, B in FIG. 16A. Then, the upper cover unit 203 is assembled to the main unit 201 as shown by arrow C.

During the assembly of the cover units 201-204, electrical components provided in the cover units 202-204 are electrically connected to electrical components of the main unit 201 by using e.g. FPCs. Then, the cover units 202-204 are fixed to the main unit 201 by screws.

Figure 16B:
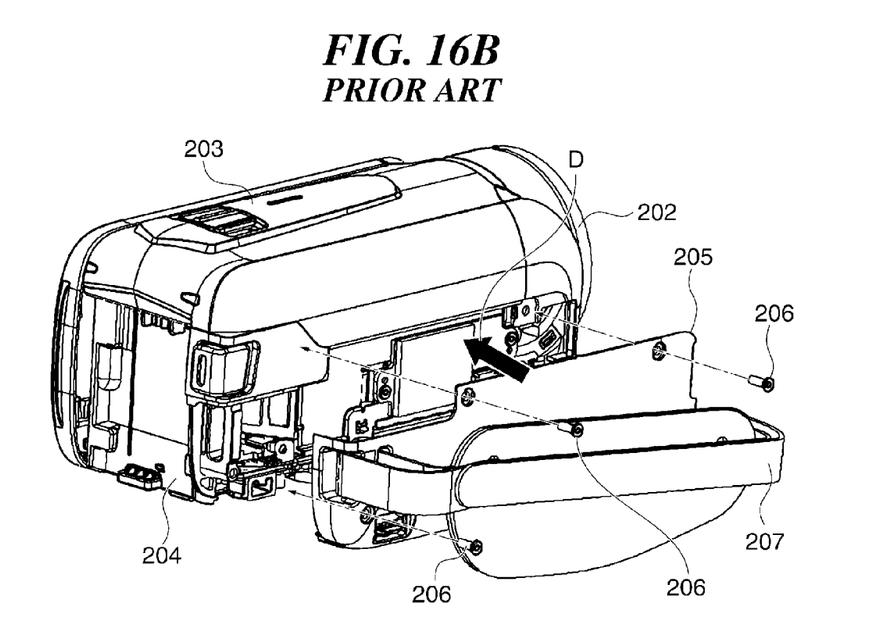

Subsequently, the right cover unit 205 having a grip belt 207 for use by a user to hold the camera is rigidly fixed to the main unit 201 by screws 206, as shown by arrow D in FIG. 16B.

In a video camera having the above-described construction, there has been known a cover connecting structure in which covers are assembled while overlapping with one another. For example, a drip-proof protection cover is disclosed in Japanese Laid-open Patent Publication No. 8-15771. With such a cover connecting structure, the design and drip-proof of the covers can be ensured.

However, with the above-described prior art, the cover units 202-205 are fixed by using a large number of screws and therefore assembly man-hours increase. Since head portions of the screws 206 for fixing the right cover unit 205 to the main unit 201 are exposed to the outside, the appearance design of the video camera is impaired.

SUMMARY OF THE INVENTION

The present invention provides an electronic apparatus capable of reducing assembly man-hours thereof to reduce fabrication costs and capable of improving appearance design thereof.

According to the present invention, there is provided an electronic apparatus having a first exterior cover and a second exterior cover connected to the first exterior cover, wherein the first and second exterior covers have first and second abutment portions, respectively, the first exterior cover has engagement portions formed on an inner face of the first exterior cover on a side close to the first abutment portion and has latch portions each disposed between adjacent ones of the engagement portions and provided to protrude toward the second exterior cover beyond the first abutment portion, the second exterior cover has engaged portions disposed along the second abutment portion so as to correspond to the engagement portions of the first exterior cover and provided to protrude toward the first exterior cover beyond the second abutment portion and has latched portions each disposed between adjacent ones of the engaged portions so as to correspond to the latch portions of the first exterior cover, the engaged portions of the second exterior cover are engaged with the engagement portions of the first exterior cover, and the latched portions of the second exterior cover are latched to the latch portions of the first exterior cover.

With this invention, the assembly man-hours of the electronic apparatus can be reduced to reduce fabrication costs thereof and the appearance design of the electronic apparatus can be improved.

Further features of the present invention will become apparent from the following description of an exemplary embodiment with reference to the attached drawings.

DESCRIPTION OF THE EMBODIMENTS

The present invention will now be described in detail below with reference to the drawings showing a preferred embodiment thereof.

Figure 1A:
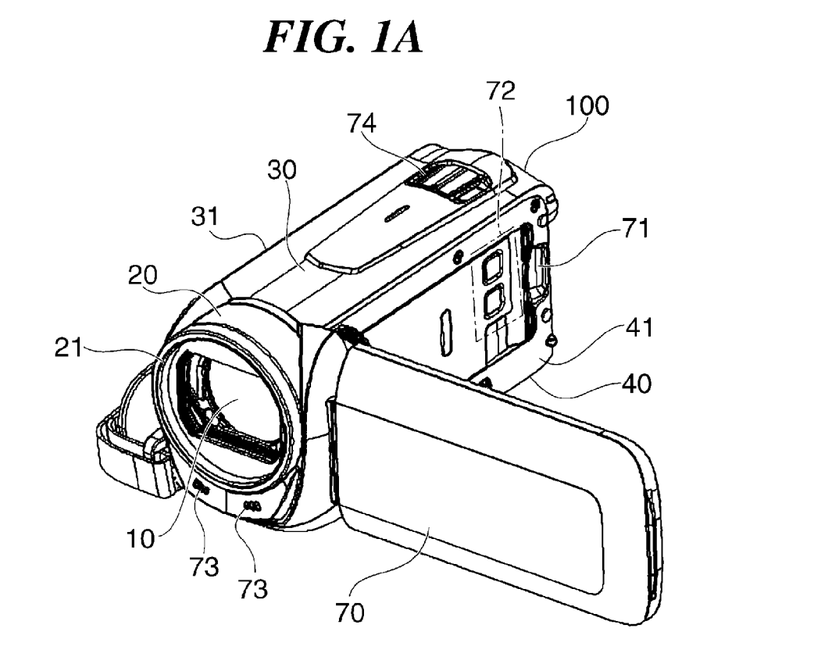
FIG. 1A is a front perspective view of a digital video camera, which is an example of an electronic apparatus of this invention.
Figure 1B:
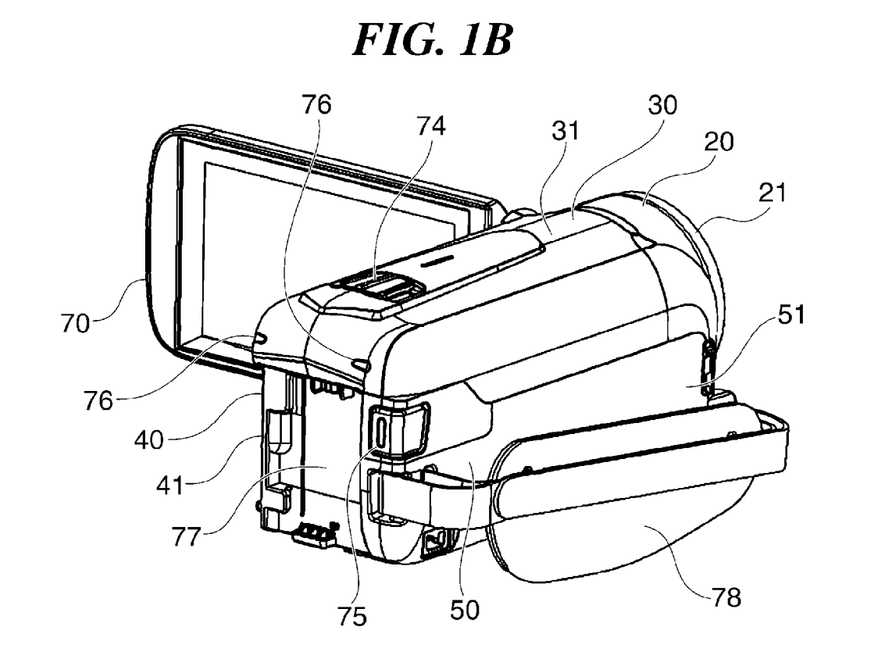
FIG. 1B is a rear perspective view of the digital video camera.
Figure 2:
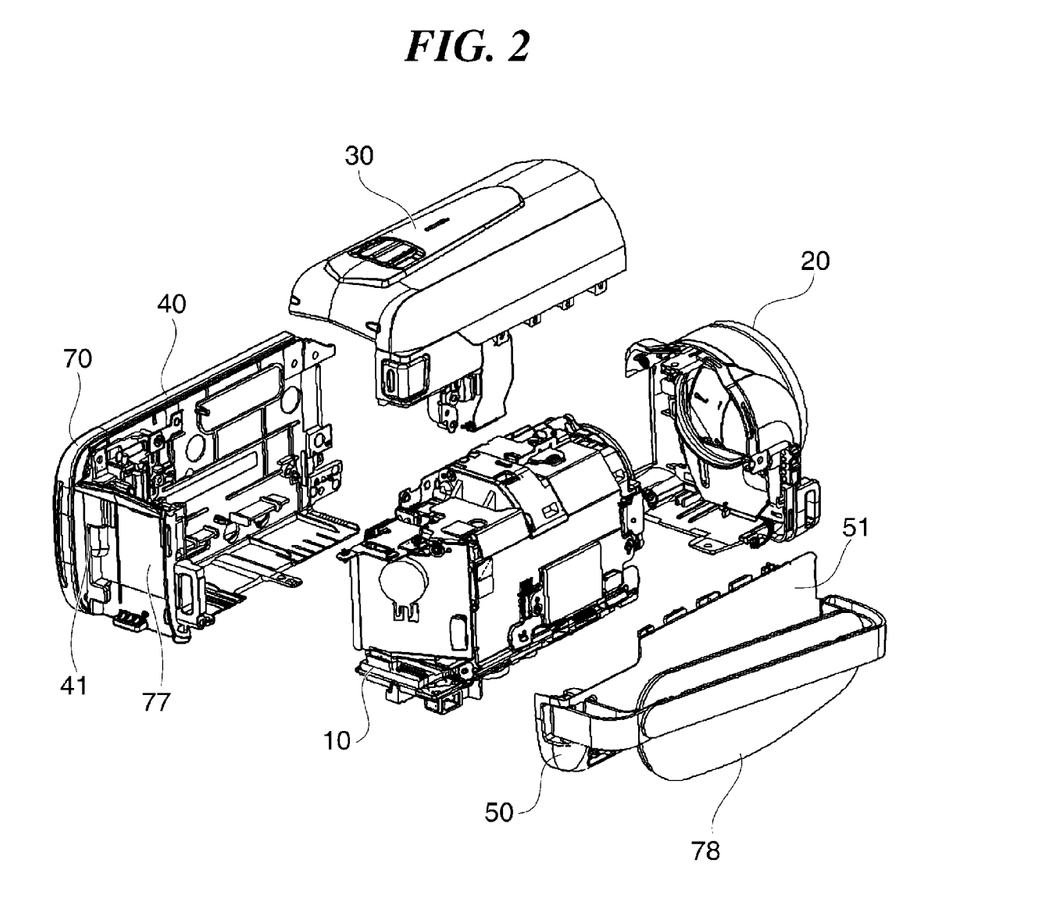
FIG. 2 is an exploded perspective view of the digital video camera.

FIGS. 1A and 1B show in front and rear perspective views a digital video camera, which is an example of an electronic apparatus according to one embodiment of this invention. FIG. 2 shows the digital video camera in exploded perspective view. It should be noted that the electronic apparatus of this invention is not limited to the digital video camera or to other image pickup apparatus.

As shown in FIGS. 1 and 2, the digital video camera 100 of this embodiment has a main unit 10 that is covered by a front cover unit 20, an upper cover unit 30, a left cover unit 40, and a right cover unit 50.

The main unit 10 includes an image pickup optical system, an image pickup device, and a main circuit board (none of which are illustrated). The main circuit board is mounted with a control circuit for controlling the entire camera 100 and for performing various processing.

The front cover unit 20 has a front cover 21 that is provided with microphones 73 and formed with an opening through which the image pickup optical system of the main unit 10 can be exposed to the outside.

The upper cover unit 30 has an upper cover 31, which is an example of a first exterior cover of this invention. The upper cover 31 forms an upper exterior surface, a part of a rear exterior surface, and a part of a right exterior surface of the camera 100. A zoom lever 74 is provided on the upper exterior surface of the camera 100 formed by the upper cover 31, and a trigger key 75 and LED emission parts 76 are provided on the rear exterior surface part of the camera 100.

The left cover unit 40 has a left cover 41 to which a display unit 70 implemented by e.g. an LCD is attached via a hinge (not shown) so as to be capable of being opened and closed relative to the left cover 41. The left cover 41 forms a left exterior surface, a part of the rear exterior surface, and a part of a lower exterior surface of the camera 100. A card slot 71 and operation keys 72 are provided on the left exterior surface of the camera 100 formed by the left cover 41, and a battery chamber 77 is provided in the rear exterior surface part of the camera 100.

The right cover unit 50 has a right cover 51, which is an example of a second exterior cover of this invention. A grip belt 78 for use by a photographer to grip the camera 100 is attached to the right cover 51. The right cover 51 forms the right exterior surface, a part of the rear exterior surface, and a part of the lower exterior surface of the camera 100.

Figure 3A:
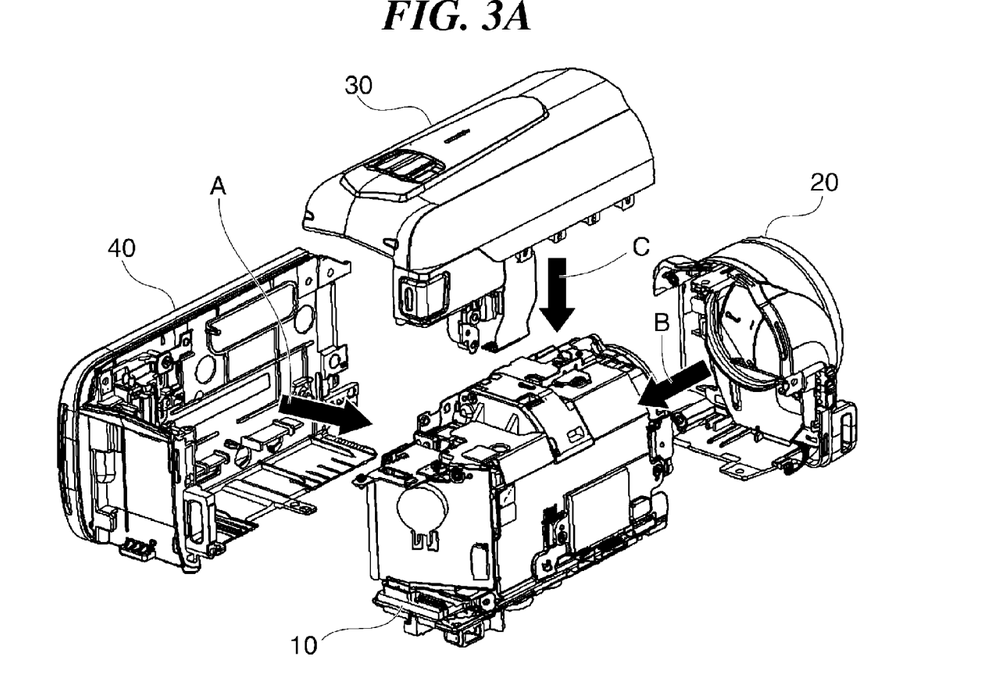
FIG. 3A is a perspective view showing how a left cover unit, a front cover unit, and an upper cover unit of the digital video camera are assembled to a main unit thereof.
Figure 3B:
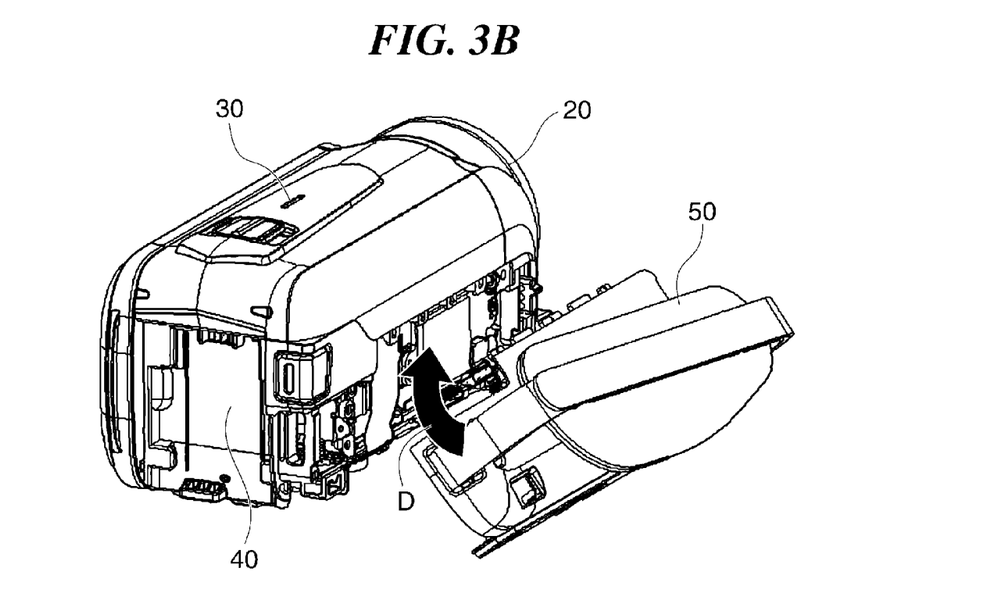
FIG. 3B is a perspective view showing how a right cover unit is assembled to a semi-finished assembly in which the left cover unit, the front cover unit, and the upper cover unit have been assembled to the main unit.

FIG. 3A shows in perspective view how the front cover unit 20, the upper cover unit 30, and the left cover unit 40 are assembled to the main unit 10. FIG. 3B shows in perspective view how the right cover unit 50 is assembled to a semi-finished assembly in which the cover units 20-40 have been assembled to the main unit 10.

First, the left cover unit 40 is assembled to the main unit 10 from the left side as shown by arrow A in FIG. 3A. Next, the front cover unit 20 is assembled to the main unit 10 from the front side as shown by arrow B, and the upper cover unit 30 is assembled to the main unit 10 from above as shown by arrow C.

During the assembly of the cover units 10-40, electrical components provided in the cover units 20-40 are electrically connected to electrical components of the main unit 10 by using e.g. FPCs. Then, the cover units 20-40 are fixed to the main unit 10 by screws.

Subsequently, the right cover unit 50 is assembled to the upper cover 31 of the upper cover unit 30 while rotating the right cover unit 50 in the direction shown by arrow D in FIG. 3B, and the right cover unit 50 is fixed to the main unit 10 by screws. It should be noted that the details of assembly of the right cover unit 50 to the upper cover unit 30 will be described later.

Figure 4A:
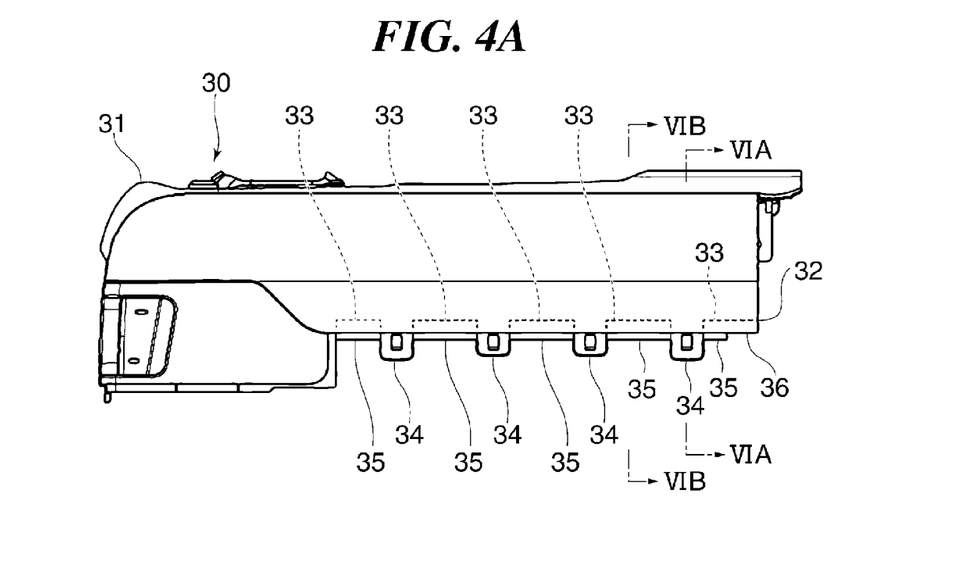
FIG. 4A is a side view of an upper cover of the upper cover unit.
Figure 4B:
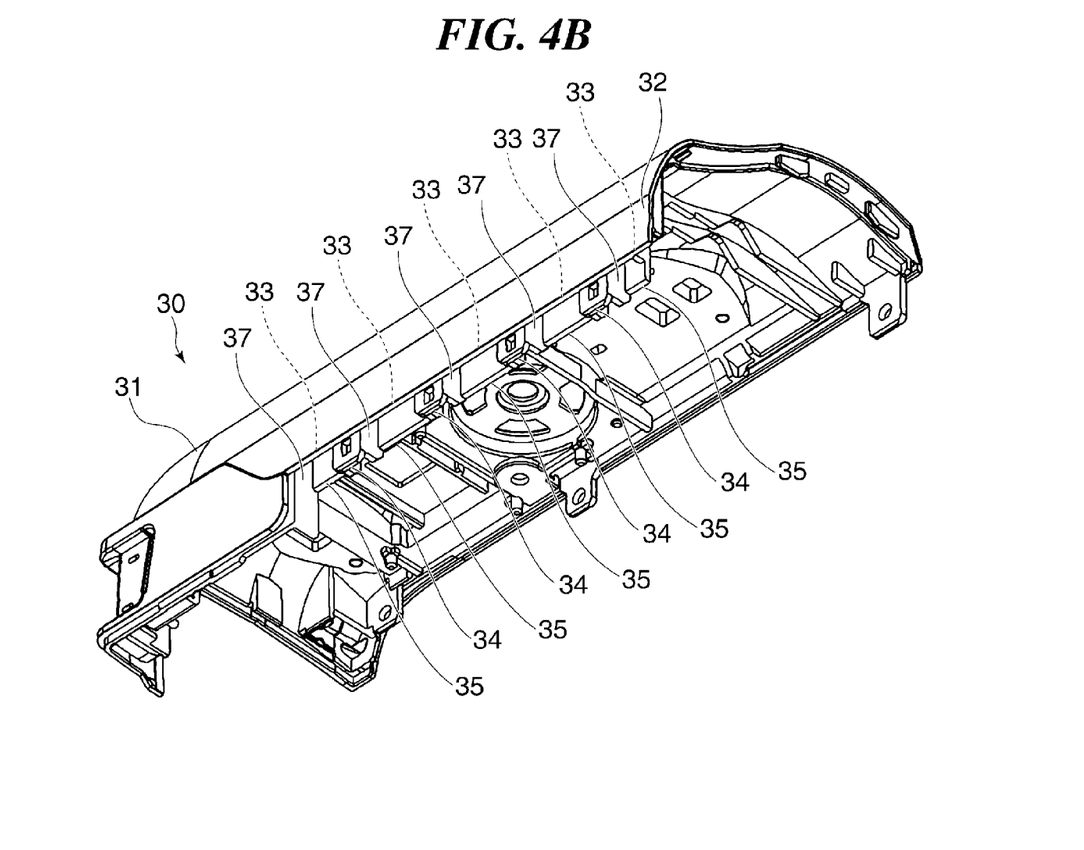
FIG. 4B is a bottom perspective view of the upper cover.
Figure 5:
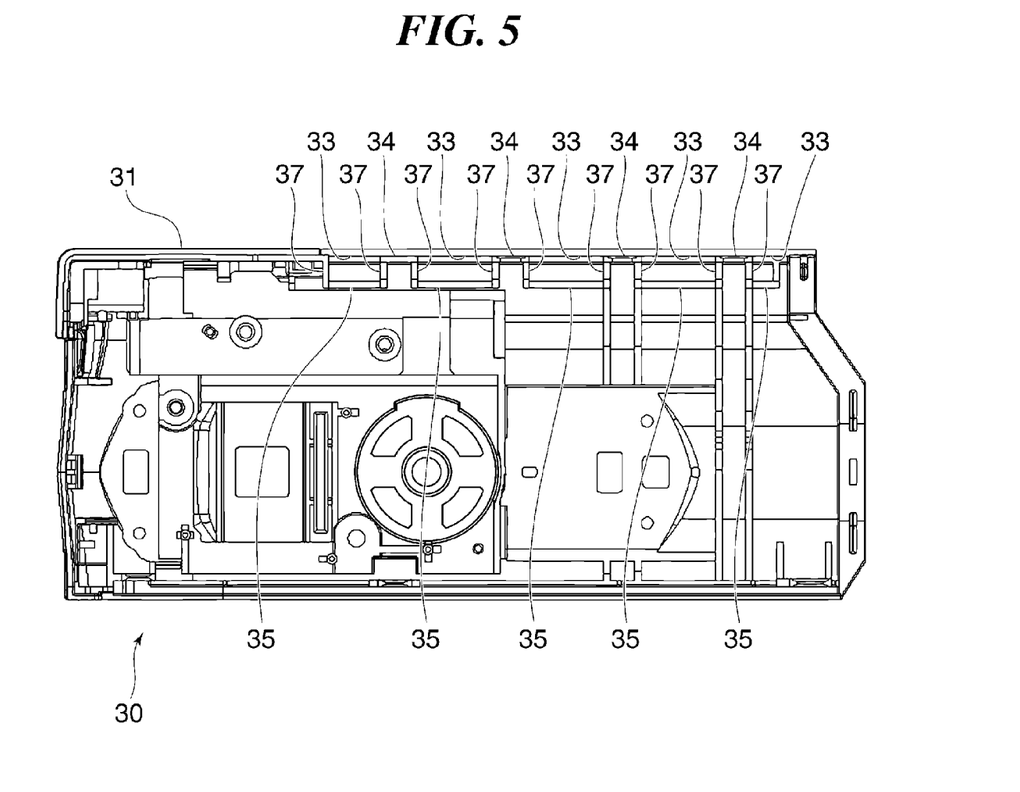
FIG. 5 is a bottom view of the upper cover.
Figure 6A:
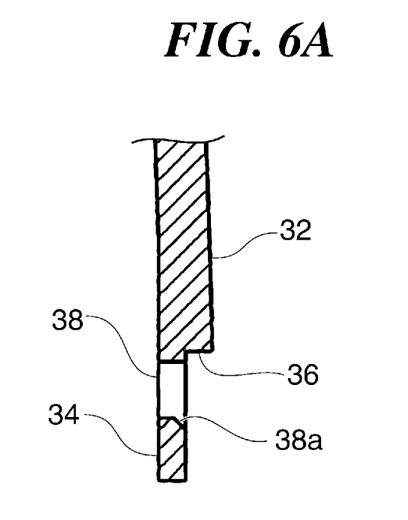
FIG. 6A is a section view taken along line VIA-VIA in FIG. 4A.
Figure 6B:
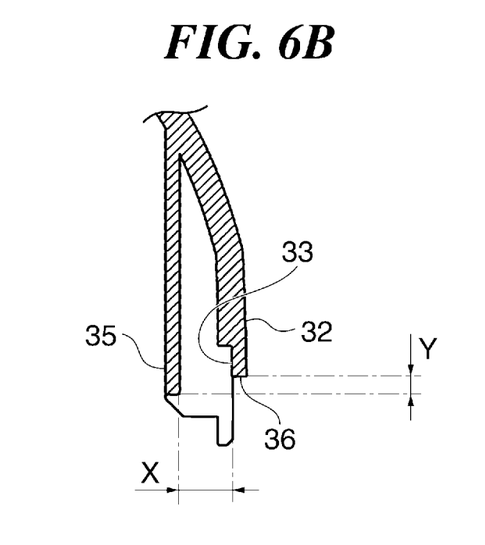
FIG. 6B is a section view taken along line VIB-VIB in FIG. 4A.

FIGS. 4A and 4B and FIG. 5 show the upper cover 31 of the upper cover unit 30 in side view, in bottom perspective view, and in bottom view. FIGS. 6A and 6B are section views respectively taken along lines VIA-VIA and VIB-VIB in FIG. 4A.

As shown in FIGS. 4 and 5, the upper cover 31 of the upper cover unit 30 has a connection part 32 configured for connection with the right cover 51 of the right cover unit 50. The connection part 32 has engagement portions 33, latch portions 34, inside ribs 35, an abutment portion 36, and connection ribs 37.

Figure 7A:
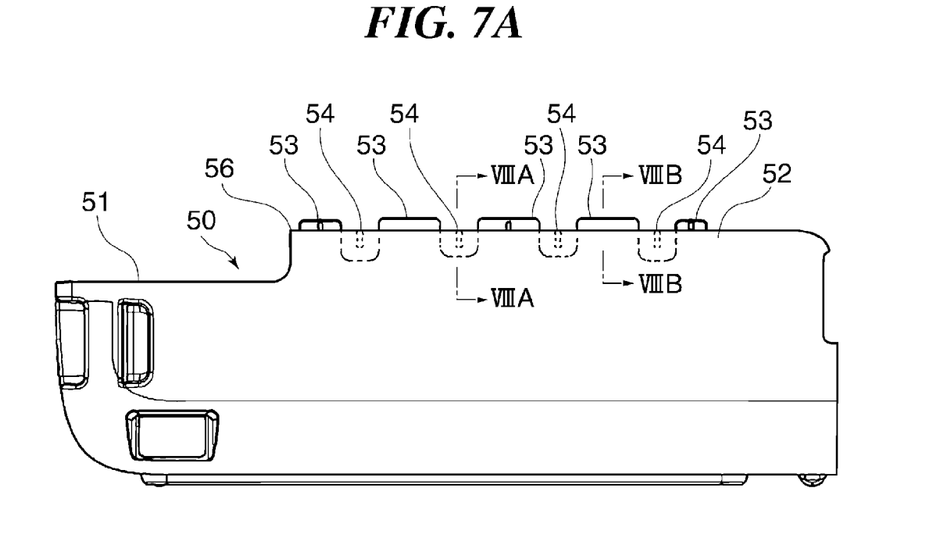
FIG. 7A is a side view of a right cover of the right cover unit.
Figure 7B:
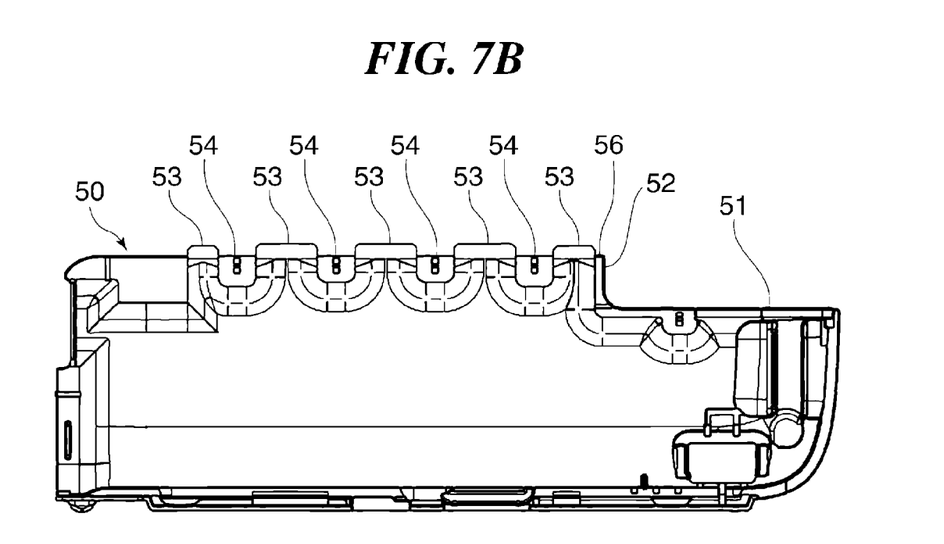
FIG. 7B is an inner side view of the right cover.

The abutment portion 36 of the connection part 32 of the upper cover 31 is configured for abutment with an abutment portion 56 of the connection part 52 of the right cover 51 shown in FIGS. 7A and 7B. Hereinafter, the abutment portions 36, 56 will be sometimes referred to as the first and second abutment portions, respectively.

The engagement portions 33 of the upper cover 31 are disposed along the abutment portion 36. As shown in FIG. 6B, each of the engagement portions 33 is provided on an inner face of a top end portion (on the side close to the abutment portion 36) of the connection part 32 and formed into a recessed step shape. The latch portions 34 are disposed between adjacent ones of the engagement portions 33. As shown in FIG. 6A, the latch portions 34 are provided inside the abutment portion 36 so as to project toward the right cover 51 (downward) beyond the abutment portion 36. Each of the latch portions 34 is formed with a latch hole 38 that is rectangular in section and that has a slanted face portion 38a.

As shown in FIG. 6B, the inside ribs 35 are disposed inside the engagement portions 33 with a predetermined distance X and provided to downwardly project by a predetermined distance Y beyond the abutment portion 36. The connection ribs 37 by which the engagement portions 33 and the inside ribs 35 are connected together are disposed at respective ends of the latch portions 34. By connecting the engagement portions 33 and the inside ribs 35 together by the connection ribs 37, the strength of the connection part 32 of the upper cover 31 can be increased.

Figure 8A:
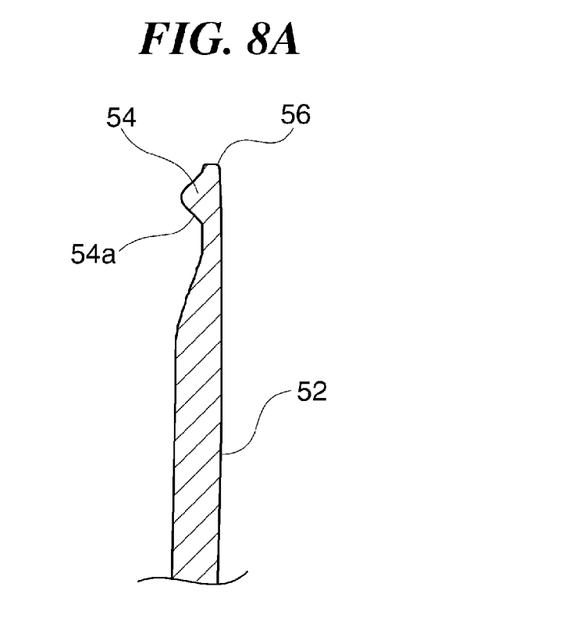
FIG. 8A is a section view taken along line VIIIA-VIIIA in FIG. 7A.
Figure 8B:
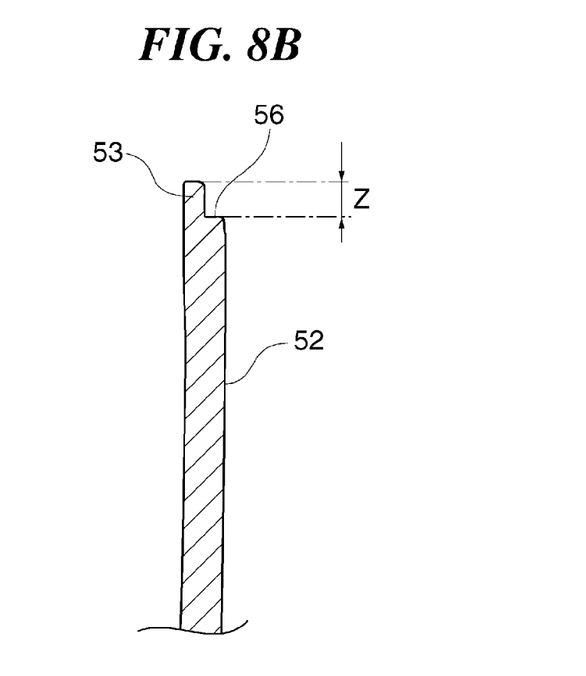
FIG. 8B is a section view taken along line VIIIB-VIIIB in FIG. 7A.

FIGS. 7A and 7B show the right cover 51 of the right cover unit 50 in side view and in inner side view. FIGS. 8A and 8B are section views respectively taken along lines VIIIA-VIIIA and VIIIB-VIIIB in FIG. 7A.

As shown in FIGS. 7A and 7B, the right cover 51 of the right cover unit 50 has the connection part 52 configured to be connected to the upper cover 31 of the upper cover unit 30. The connection part 52 is provided with engaged portions 53, latch pawls 54 that are an example of latched portions of this invention, and a second abutment portion 56. The second abutment portion 56 is configured for abutment with the first abutment portion 36 of the connection part 32 of the upper cover 31.

The engaged portions 53 are disposed along the second abutment portion 56 to correspond to the engagement portions 33 of the upper cover 31. As shown in FIG. 8B, the engaged portions 53 are provided inside the abutment portion 56 to project toward the upper cover 31 (upward) beyond the abutment portion 56 by a predetermined distance Z for engagement with the engagement portions 33 of the upper cover 31.

The latch pawls 54 are disposed between adjacent ones of the engaged portions 53 to correspond to the latch holes 38 of the latch portions 34 of the upper cover 31. As shown in FIG. 8A, the latch pawls 54 are provided on an inner face of a tip end portion of the connection part 52 to face the latch holes 38 (FIG. 6A) of the latch portions 34 of the upper cover 31 for engagement with the latch holes 38. Each of the latch pawls 54 is formed with a slanted face portion 54a for abutment with the slanted face portion 38a of the latch hole 38 when the latch pawl 54 is latched with the latch hole 38.

Figure 9:
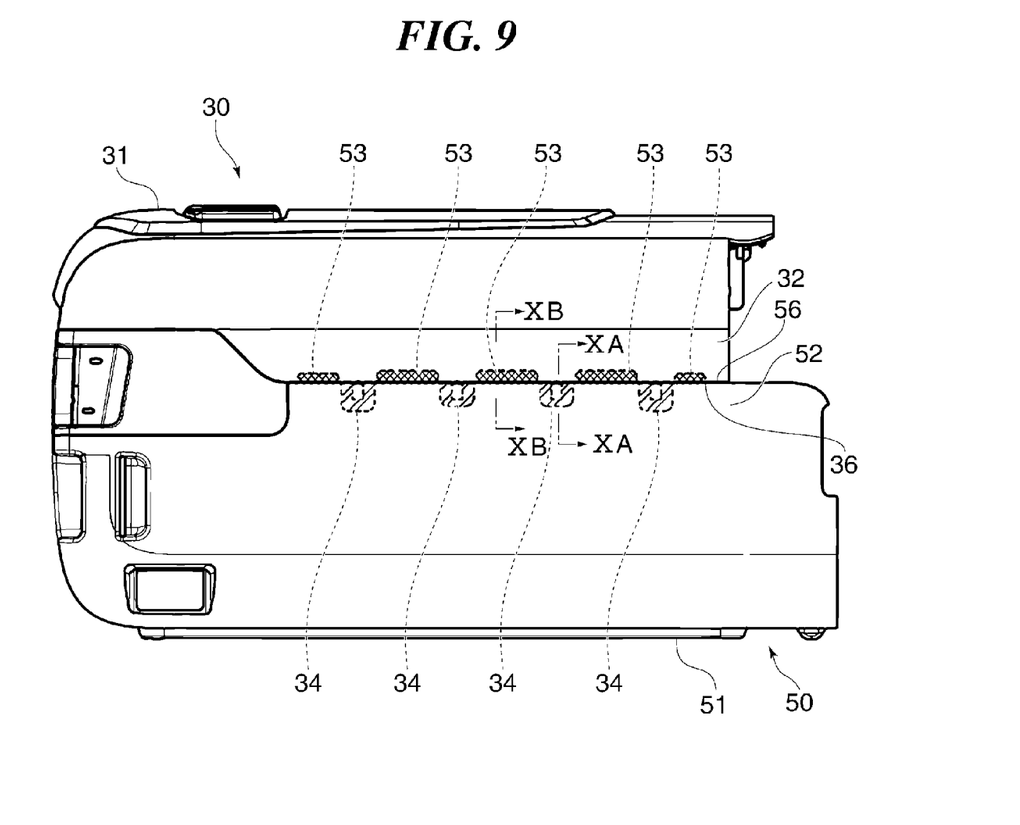
FIG. 9 is a side view showing a state where the right cover unit has been assembled to the upper cover unit.
Figure 10A:
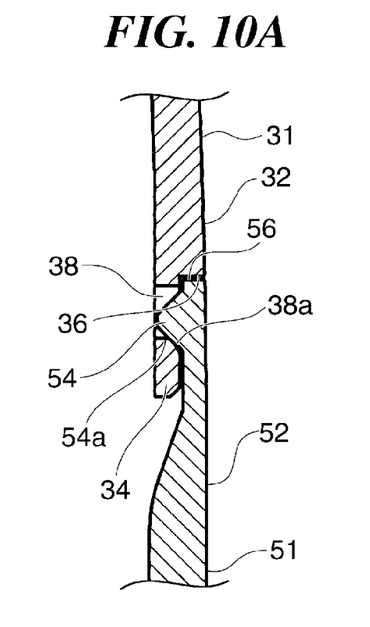
FIG. 10A is a section view taken along line XA-XA in FIG. 9.
Figure 10B:
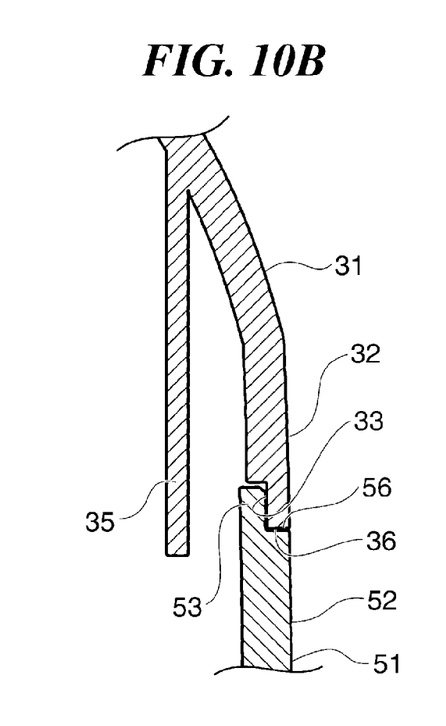
FIG. 10B is a section view taken along line XB-XB in FIG. 9.
Figure 11:
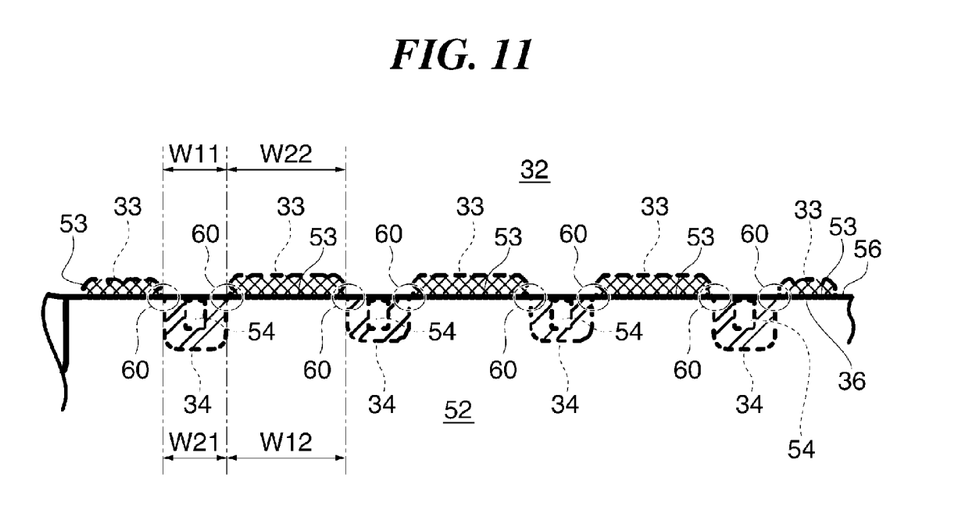
FIG. 11 is an enlarged view of a connection part of the upper cover and a connection part of the right cover.

FIG. 9 shows in side view a state where the right cover unit 50 has been assembled to the upper cover unit 30. FIGS. 10A and 10B are section views respectively taken along lines XA-XA and XB-XB in FIG. 9. FIG. 11 shows in enlarged view the connection part 32 of the upper cover 31 and the connection part 52 of the right cover 51.

In the state where the right cover unit 50 has been assembled to the upper cover unit 30, the abutment portion 56 of the right cover 51 is in abutment with the abutment portion 36 of the upper cover 31, and the latch portions 34 of the upper cover 31 and the engaged portions 53 of the right cover 51 are alternately disposed, as shown in FIGS. 9 and 11. The alternate arrangement of the latch portions 34 and the engaged portions 53 suppresses relative positional deviations between the upper cover 31 and the right cover 51 in the left-right direction and in the front-back direction.

Furthermore, the engaged portions 53 are engaged with the engagement portions 33 as shown in FIG. 10B, and the latch pawls 54 are latched to the latch holes 38 of the latch portions 34 as shown in FIG. 10A in a state where the slanted face portions 54a of the latch pawls 54 are in abutment with the slanted face portions 38a of the latch holes 38. By the abutment between the slanted face portions 38a, 54a and by the abutment between the abutment portions 36, 56, a relative positional deviation between the upper cover 31 and the right cover 51 in a vertical direction is suppressed.

Since relative positional deviations between the upper cover 31 and the right cover 51 in the vertical direction, in the front-rear direction, and in the left-right direction can be suppressed as described above, the mounting strength of the right cover 51 to the upper cover 31 can be improved and the number of screws for fixing the right cover 51 can be decreased.

In FIG. 11, symbol W11 denotes a size of the distance between adjacent ones of the engaged portions 53, and W21 denotes a size of the width of the latch portions 34. The distance size W11 is slightly larger than the width size W21. Symbol W12 denotes a size of the distance between the latch portions 34, and W22 denotes a size of the width of the engaged portions 53. The distance size W12 is slightly larger than the width size W22. As a result, size errors of cover components can be absorbed at mass production, and the right cover 51 can easily be assembled to the upper cover 31. Since the inside ribs 35 are provided inside the engagement portions 33 to downwardly project beyond the abutment portion 36 as previously described, the interior of the camera is not visible via a gap 60 between the latch portions 34 and the engaged portions 53.

Figure 12:
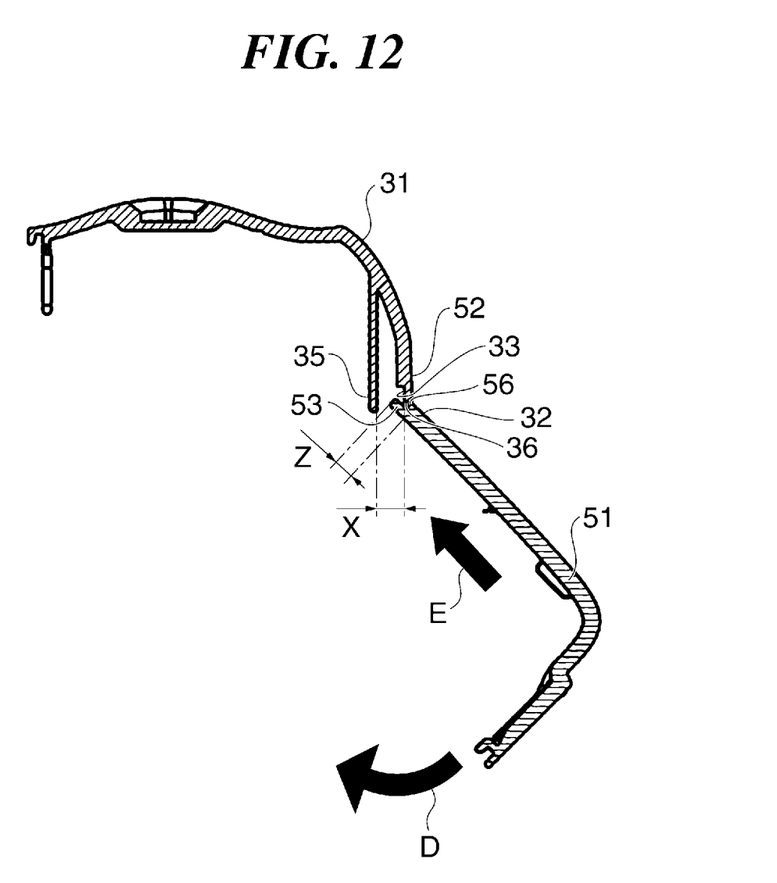
FIG. 12 is a section view showing how the right cover is assembled to the upper cover.
Figure 13A:
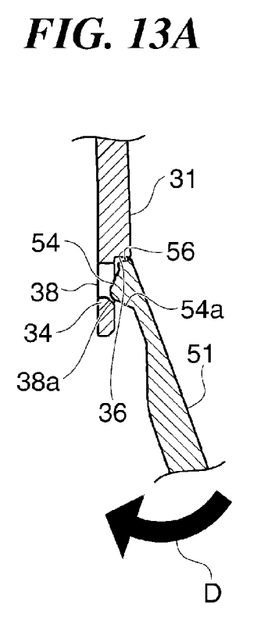
FIGS. 13A to 13C are other section views showing how the right cover is assembled to the upper cover.
Figure 13B:
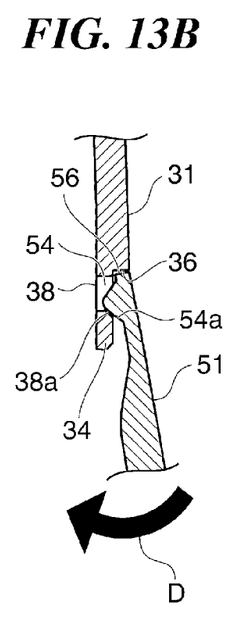
Figure 13C:
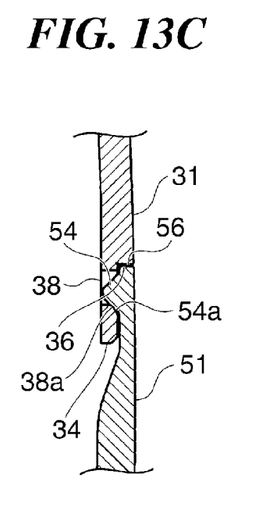
Figure 14:
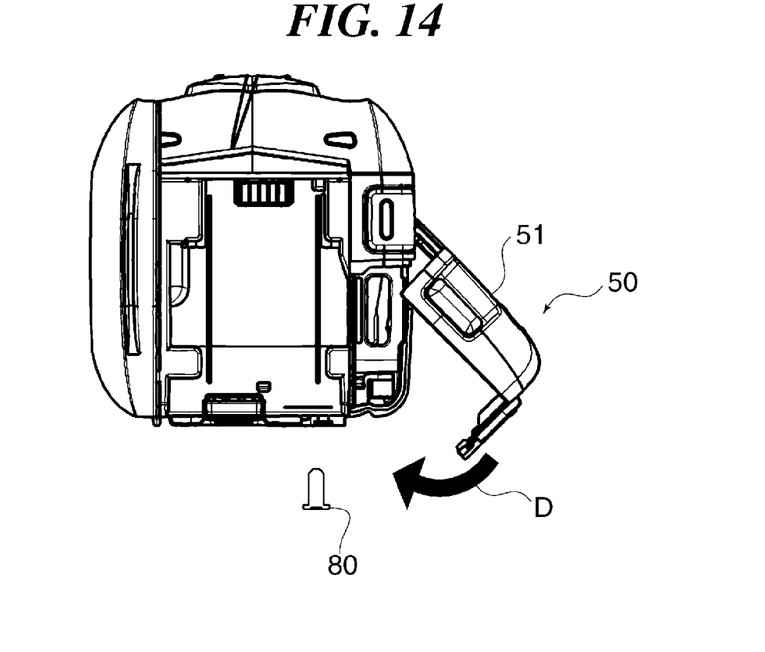
FIG. 14 is a view showing a state where the right cover is being assembled to the upper cover as seen from the rear of the camera.
Figure 15:
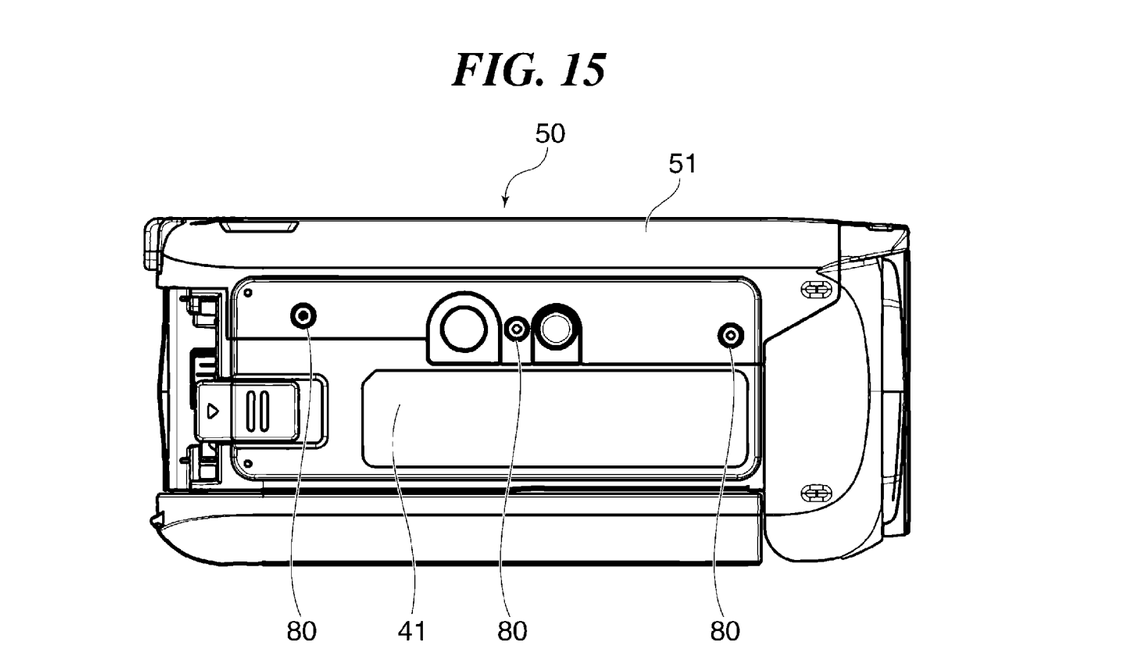
FIG. 15 is a view showing a state where the right cover has been assembled to the upper cover as seen from the lower side of the camera.

FIG. 12 shows how the right cover 51 is assembled to the upper cover 31 in section at a position where the engagement portions 33 and the engaged portions 53 are disposed. FIGS. 13A to 13C shows how the right cover 51 to the upper cover 31 in section at a position where the latch portion 34 and the latch pawl 54 are disposed. FIG. 14 shows a state where the right cover 51 is being assembled to the upper cover 31 as seen from the rear of the camera 100. FIG. 15 shows a state where the right cover 51 has been assembled to the upper cover 31 as seen from the lower side of the camera 100.

To assemble the right cover 51 to the upper cover 31, the engaged portions 53 of the right cover 51 are inserted into between the engagement portions 33 and the inside ribs 35 of the upper cover 31 from obliquely below in a direction of arrow E as shown in FIG. 12. Then, the right cover 51 is rotated in a direction of arrow D as shown in FIG. 12 and in FIGS. 13A to 13C.

As a result, the right cover 51 is assembled to the upper cover 31. More specifically, the abutment portion 56 is abutted with the abutment portion 36, and the engaged portions 53 are engaged with the engagement portions 33. Further, the latch pawls 54 are latched to the latch holes 38 of the latch portions 34, and the slanted face portions 54a are abutted with the slanted face portions 38a (FIG. 13C).

As shown in FIG. 12, the engaged portions 53 of the right cover 51 each have a projection length Z shorter than a distance X between the engagement portions 33 and the inside ribs 35 of the upper cover 31. When the right cover 51 is assembled to the upper cover 31, the assembly of the right cover 51 to the upper cover is not hindered, as shown in FIGS. 13A and 13B, by interference between the slanted face portions 38a of the latch holes 38 and the slanted face portions 54a of the latch pawls 54. Accordingly, the right cover 51 can smoothly be assembled to the upper cover 31.

After the right cover 51 has been assembled to the upper cover 31, the right cover 51 is fixed at its lower surface to the main unit 10 by using screws 80 as shown in FIGS. 14 and 15. In the fixed state, a lower part of the camera 100 is covered by the left cover 41 and the right cover 51.

As described above, according to this embodiment, the number of the screws for fixing the cover units 20-50 to the main unit 10 can be reduced, whereby assembly man-hours and fabrication costs can be reduced.

With this embodiment, the number of screws 80 for fixing the right cover unit 50 to the main unit 10 can be reduced. Since the right cover unit 50 is fixed to the lower surface of the camera 100 by using the screws 80, the appearance design of the camera 100 can be improved.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2012-279469, filed Dec. 21, 2012, which is hereby incorporated by reference herein in its entirety.

What is claimed is:

1. An electronic apparatus comprising:
    a first exterior cover; and
    a second exterior cover connected to the first exterior cover,
    wherein said first and second exterior covers have first and second abutment portions, respectively,
    wherein said first exterior cover has:
        engagement portions formed on an inner face of said first exterior cover on a side close to the first abutment portion;
        latch portions each disposed between adjacent ones of the engagement portions and provided to protrude toward said second exterior cover beyond the first abutment portion;
        inside ribs disposed inside the engagement portions with a distance therefrom and project toward said second exterior cover beyond the first abutment portion; and
        connection ribs disposed on respective ends of the latch portions and connecting the inside ribs with the engagement portions together,
    wherein said second exterior cover has:
        engaged portions disposed along the second abutment portion so as to correspond to the engagement portions of said first exterior cover and configured to protrude toward said first exterior cover beyond the second abutment portion; and latched portions each disposed between adjacent ones of the engaged portions so as to correspond to the latch portions of said first exterior cover, wherein the engaged portions of said second exterior cover are engaged with the engagement portions of said first exterior cover, wherein the latched portions of said second exterior cover are latched to the latch portions of said first exterior cover, wherein the latch portions each have a first slanted face portion having a first slanted face, and wherein the latched portions each have a second slanted face portion having a second slanted face, the respective first and second slanted faces of the first and second slanted face portions abutting each other in a case where the latched portions are latched to the latch portions.

2. The electronic apparatus according to claim 1, wherein the engaged portions each have a projection length shorter than a distance between the engagement portions and the inside ribs.

3. The electronic apparatus according to claim 1, further comprising a grip belt attached to said second exterior cover.

4. The electronic apparatus according to claim 1, wherein each of the latch portions includes a latch hole provided with the first slanted face.

5. The electronic apparatus according to claim 4, wherein:
each of the latched portions include a protrusion having the second slanted face, and
the protrusion is disposed inside the latch hole upon the respective latch portion and latched portion being latched.

* * * * *